(12) United States Patent
Tavakoli et al.

(10) Patent No.: US 11,283,322 B2
(45) Date of Patent: Mar. 22, 2022

(54) CAGE FOR WOUND ROTOR OF A SYNCHRONOUS ELECTRIC MACHINE

(71) Applicants: Renault s.a.s., Boulogne-Billancourt (FR); NISSAN MOTOR CO., LTD., Yokohama (JP)

(72) Inventors: Shahab Tavakoli, Vaucresson (FR); Anthony Dell Agnese, Argenteuil (FR); Ferdinand Frabolot, Paris (FR)

(73) Assignees: Renault s.a.s., Boulogne-Billancourt (FR); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/056,908

(22) PCT Filed: May 13, 2019

(86) PCT No.: PCT/EP2019/062219
§ 371 (c)(1),
(2) Date: Nov. 19, 2020

(87) PCT Pub. No.: WO2019/224036
PCT Pub. Date: Nov. 28, 2019

(65) Prior Publication Data
US 2021/0159751 A1 May 27, 2021

(30) Foreign Application Priority Data

May 22, 2018 (FR) ...................................... 18 54258

(51) Int. Cl.
*H02K 3/51* (2006.01)
*H02K 3/487* (2006.01)
(Continued)

(52) U.S. Cl.
CPC ............... *H02K 3/51* (2013.01); *H02K 3/487* (2013.01); *H02K 3/52* (2013.01); *H02K 17/16* (2013.01)

(58) Field of Classification Search
CPC .......... H02K 17/16; H02K 3/487; H02K 3/52; H02K 3/51; H02K 3/522; H02K 3/524;
(Continued)

(56) References Cited

U.S. PATENT DOCUMENTS

| | | | |
|---|---|---|---|
| 4,075,522 A | 2/1978 | Hoffman | |
| 4,506,181 A * | 3/1985 | Jones | ...................... H02K 21/46 |
| | | | 310/156.78 |

(Continued)

FOREIGN PATENT DOCUMENTS

| | | |
|---|---|---|
| FR | 1 454 211 | 7/1966 |
| FR | 2602 103 A1 | 1/1988 |
| GB | 2210512 A | 6/1989 |

OTHER PUBLICATIONS

International Search Report dated Jul. 24, 2019 in PCT/EP2019/062219 filed on May 13, 2019, 2 pages.

*Primary Examiner* — Naishadh N Desai
(74) *Attorney, Agent, or Firm* — Oblon, McClelland, Maier & Neustadt, L.L.P.

(57) ABSTRACT

A cage for a wound rotor includes a first portion and a second portion to be rigidly connected to one another. Each portion includes an end ring and a circumferential plurality of rods extending away from the end ring parallel to the axis of revolution of the end ring. Each rod has a main portion and an end portion. For each rod of the first portion, the end portion of the rod is shaped to be rigidly connected to the end portion of at least one complementary rod of the second portion when the two portions are each installed at a longitudinal end of the body of the rotor so that the two (Continued)

complementary rods rigidly connected form a slot wedge extending between the two end rings of the two portions of the cage.

9 Claims, 3 Drawing Sheets

(51) Int. Cl.
*H02K 3/52* (2006.01)
*H02K 17/16* (2006.01)

(58) Field of Classification Search
CPC ........ H02K 3/525; H02K 3/527; H02K 3/528; H02K 17/165; H02K 17/18; H02K 17/185; H02K 17/20; H02K 17/205
See application file for complete search history.

(56) References Cited

U.S. PATENT DOCUMENTS

| | | | |
|---|---|---|---|
| 5,818,141 A * | 10/1998 | Cho | H02K 1/02 310/211 |
| 8,508,091 B2 * | 8/2013 | Yang | H02K 1/278 310/156.22 |
| 2009/0015084 A1 | 1/2009 | Kalavsky et al. | |

* cited by examiner

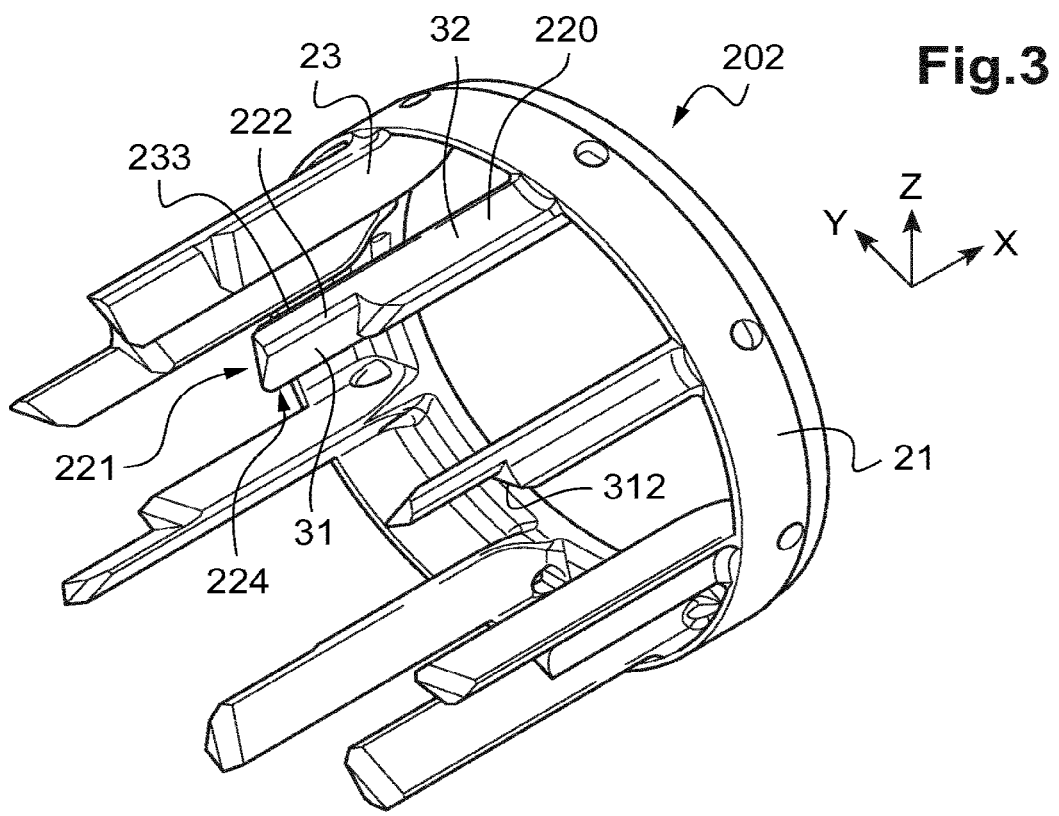
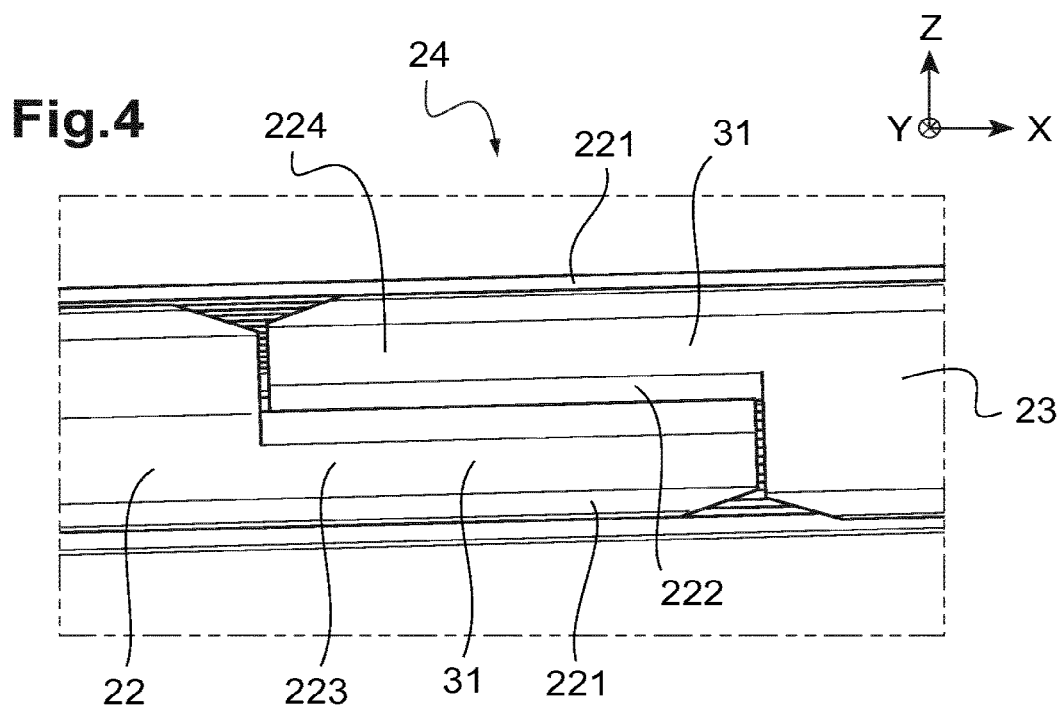

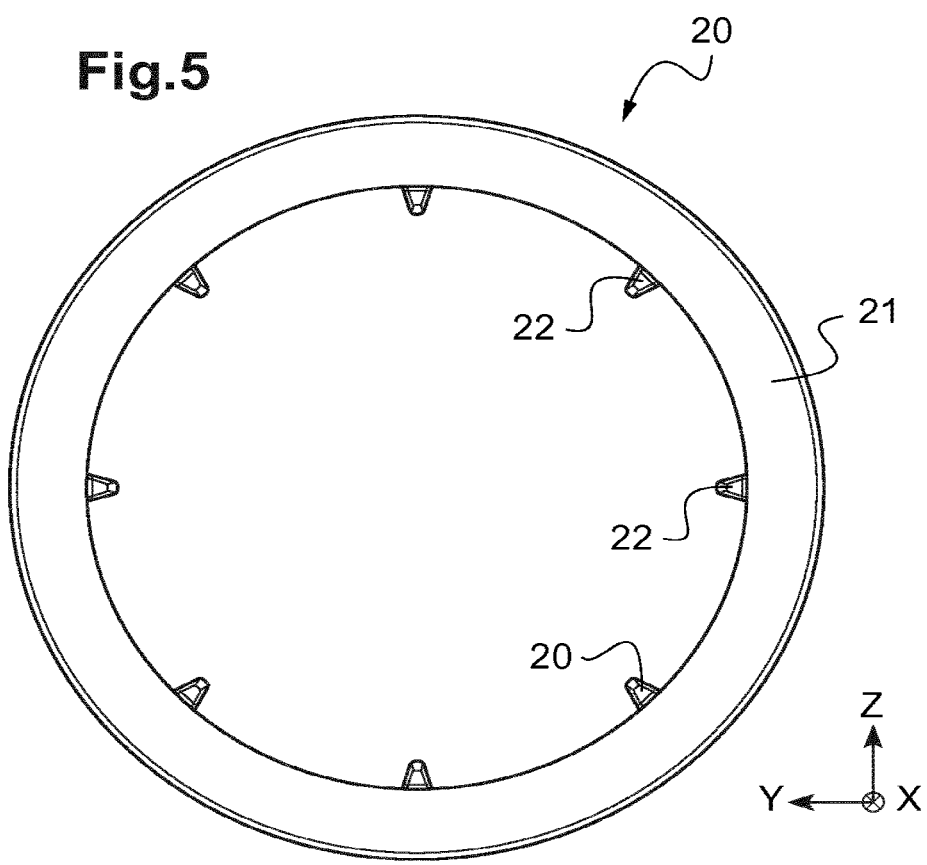

CAGE FOR WOUND ROTOR OF A SYNCHRONOUS ELECTRIC MACHINE

The present invention relates to a rotor of a synchronous electric machine.

In the field of synchronous electric machines (known by the English name of electrically excited synchronous machines, abbreviated to EESM), there are two known types of rotor: ferromagnetic rotors and wound rotors.

Wound rotors have significant qualities in terms of controllability and performance.

However, wound rotors are relatively complex to manufacture and involve a large number of components.

In particular, patent FR3043509 A1 is known, which describes a system for cooling a wound rotor. In this document, the wound rotor comprises a rotor body, two rings for holding the windings in the region of the lead-out wires, tie rods for holding the rings, and slot wedges for closing the notches receiving the windings.

However, it takes a relatively long time to assemble such a wound-rotor structure and industrialization is relatively difficult.

Thus, there is a need for a wound-rotor structure that is simpler to manufacture and to industrialize.

A cage for a wound rotor is proposed, said wound rotor comprising a body having alternating teeth and notches, said notches being designed to receive a part of a rotor winding, said cage being adapted such as to be mounted about the body of the wound rotor.

Said cage comprises a first part and a second part designed to be secured to one another, each part comprising an end ring and a circumferential plurality of rods extending from said end ring parallel to the axis of revolution of the end ring, each rod having a main portion and an end portion, and for each rod of said first part the end portion of said rod is shaped such as to be able to be secured to the end portion of at least one complementary rod of the second part when the two parts are installed, each at a longitudinal end of the body of the rotor, in such a manner that said two secured complementary rods form a slot wedge extending between the two end rings of the two parts of the cage.

It is thus possible to obtain a cage formed by two parts, which is relatively simple to assemble on the rotor and which makes it possible at the same time to ensure the holding of the end windings, by means of the holding rings, and the tie-rod functions of holding the end windings and slot wedges by means of the secured rods of each part.

It is thus possible to obtain a rotor assembly that is relatively simple, robust, low in terms of production cost and relatively rapid to install.

Advantageously, and in a non-limiting manner, said associated rods secured to one another are welded at their respective end portions. Thus, it is possible to obtain fastening of the rods to one another in a relatively robust manner for a relatively low production cost.

Advantageously and in a non-limiting manner, each rod of the first part may be secured to any one of the rods of the second part. It is thus possible to achieve even more rapid installation, because the angular position of one part relative to another is immaterial in terms of mounting.

Advantageously and in a non-limiting manner, each main portion of the rods has a cross section substantially in the form of an isosceles triangle, the base of which has a substantially concave curved form, and of which the height extends in a substantially radial direction relative to the associated end ring. It is thus possible to obtain, after securing of the rods of the two parts, slot wedges, also forming tie rods, of relatively robust and reliable form.

Advantageously and in a non-limiting manner, at least two complementary rods each have an end portion of reduced thickness relative to the main portion, and having a substantially right prism form with a rectangular base, of which a base face extends in the extension of said main portion and the other base face having a tab form. Thus, the end portions have a form that is relatively simple to achieve. Furthermore, this particular form of the end portions makes it possible to associate two cage parts obtained from one and the same mold, because the placing of the two parts opposite one another allows the joining of the end portions of the rods of the two parts.

Advantageously and in a non-limiting manner, the end portions of said complementary rods are shaped such as to allow the placing in contact of said respective tabs and to secure said respective tabs in contact. Thus, the securing, for example welding, of the rods on the tabs makes it possible to ensure that the windings are held at a distance at the time of the securing operations, which may prevent unintentional damage to the windings, for example through excessive heating or by unintentional mechanical destruction.

Advantageously and in a non-limiting manner, each part is made from an aluminum alloy, and said segments are treated in such a manner as to have a surface electrical insulation. It is thus possible to obtain slot wedges that furthermore make it possible to dispense with conventional electric insulation papers generally installed between the slot wedges and the windings. In other words, the rods thus treated make it possible, once secured, to achieve the functions of tie rods, slot wedges and electric insulation.

Advantageously and in a non-limiting manner, the surface insulation treatment comprises a hard anodizing operation. This treatment makes it possible in particular to electrically and thermally insulate the rods of the parts forming slot wedges.

The invention also relates to a rotor assembly comprising a wound rotor and a cage as described previously.

The invention also relates to an electric machine comprising a stator and a rotor assembly as described previously.

Other particular features and advantages of the invention will become apparent upon reading the description given below of a particular embodiment of the invention, which is given by way of indication but in a non-limiting manner, with reference to the appended drawings, in which:

FIG. 3 is a schematic view of a cage part according to the embodiment of FIG. 2;

FIG. 4 is a view of a detail of the join between two end portions of two rods of the two cage parts according to the embodiment of FIG. 2; and FIG. 5 is a sectional view of the cage according to the embodiment of FIG. 2.

An electric machine, in this case a synchronous electric machine, comprises a rotor assembly comprising a wound rotor 1 and a cage 20 installed about the rotor, the rotor assembly being mounted in a stator (not shown).

The wound rotor 1 has an axis of rotation extending in a "longitudinal" direction X, represented on the XYZ trihedron.

The rotor 1 is traversed in the direction of the length X by a transmission shaft (not shown).

Figure 1:
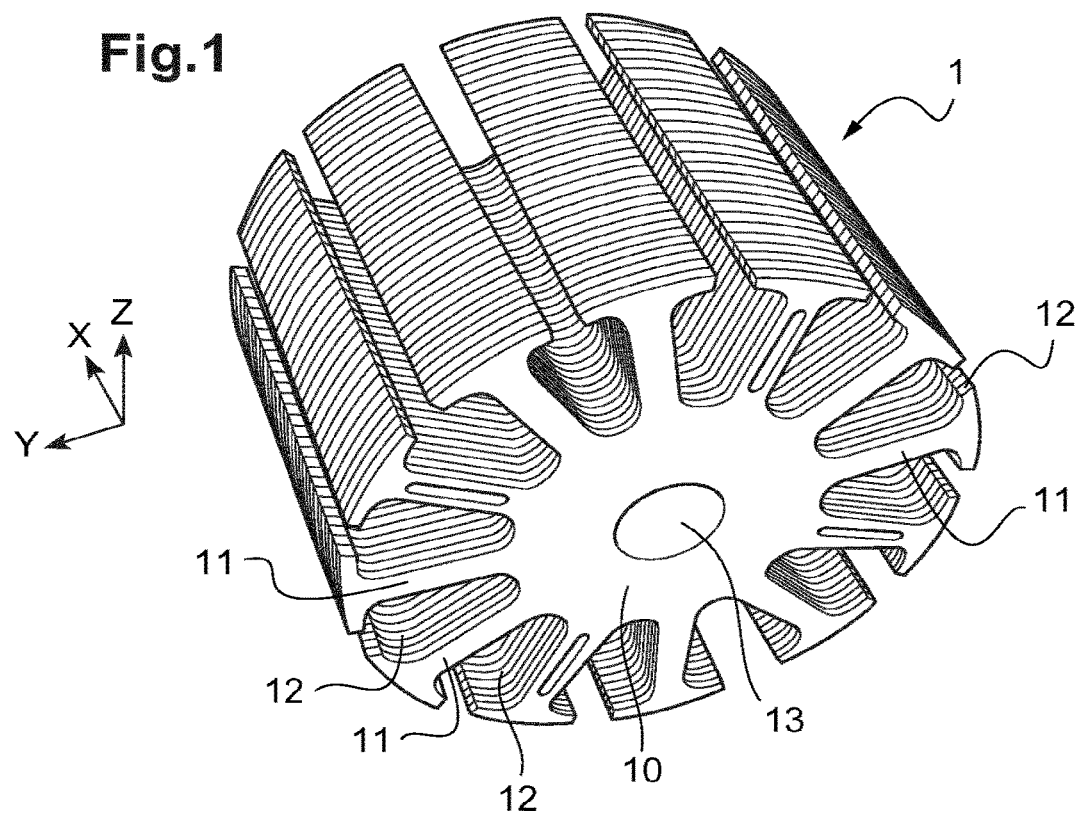
FIG. 1 is a schematic view of a known prior-art rotor body.
Figure 2:
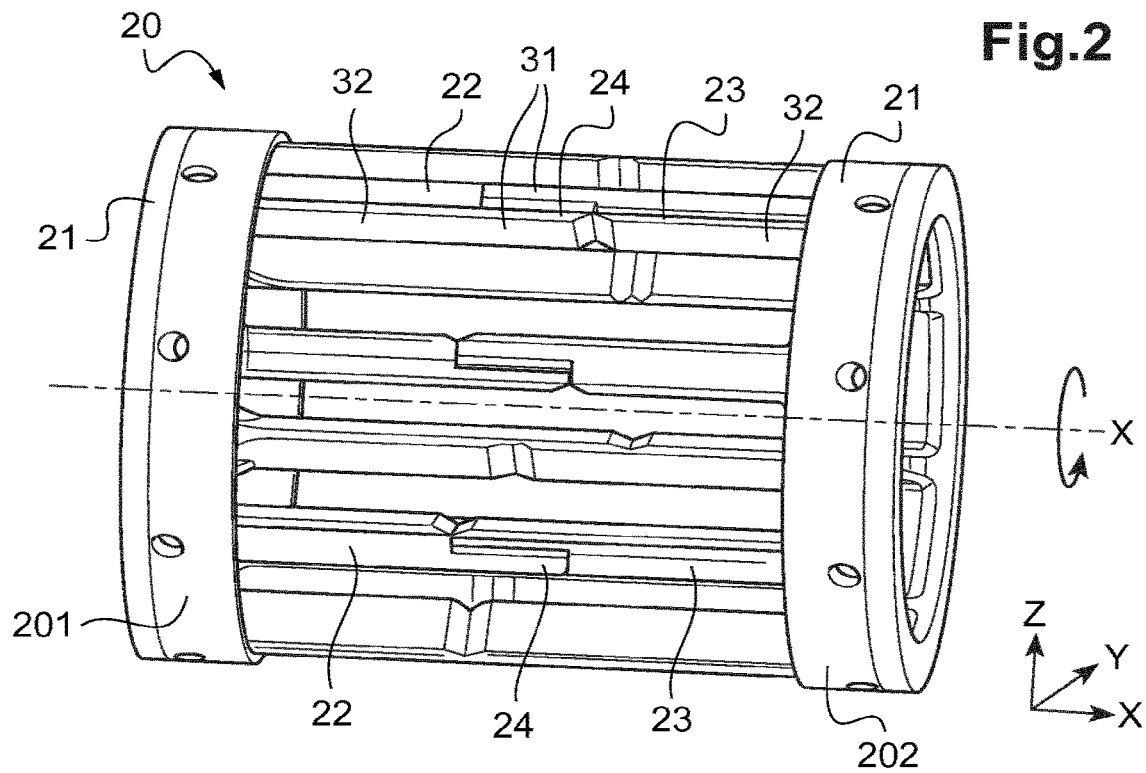
FIG. 2 is a perspective view of a cage according to one embodiment of the invention.

With reference to FIG. 1, the rotor is formed from a body 10 made from magnetic material, known in English as a stack, which may also be considered to be the core of the rotor. This stack is generally composed of a stacking of layers of sheet metal.

The stack 1 defines circumferentially alternating teeth 11 and notches 12.

The notches 12 extend between two adjacent teeth 11 and form a cut-out extending over the entire length X of the rotor, between the two adjacent teeth 11.

The teeth 11 extend radially from the center 13 of the stack 1 and over the entire length of the rotor.

Each tooth 11 receives a longitudinal winding designed to generate a rotor pole. The winding is wound about the tooth 11.

Each winding defines an end winding at each longitudinal end of the rotor.

The end windings project at each longitudinal end X of the rotor and form a lead-out wire at each end.

With reference to FIGS. 2 to 5, the rotor assembly comprises a cage 20 designed to be installed about the rotor 1 when the windings are installed about the teeth 11 of the rotor 1.

The cage 20 is formed by two separate parts 201, 202.

The two parts 201, 202 are made from metal, in this embodiment from aluminum.

Each part 201, 202 is, in this embodiment, obtained as a single component, for example a molded component, but may be the result of an assembly of components, for example by means of welding.

Each part 201, 202 is assembled prior to being installed on the rotor 1. Only the securing of the first part 201 to the second part 202 is carried out directly on the rotor 1.

Each part 201, 202 has a substantially cylindrical general form, adapted to be installed about the rotor 1 from a longitudinal end of the rotor 1.

Each part 201, 202 comprises an end ring 21 designed to engage about a longitudinal end of the rotor 1 in such a manner as to form a keeper for the end windings.

Upon mounting of the cage 20, the first part 201 is engaged at a first longitudinal end of the rotor 1, while the second part 202 is engaged at the second longitudinal end of the rotor 1, the two parts 201, 202 meeting substantially in the middle of the rotor 1, in the longitudinal direction of the rotor, in such a manner as to be able to be secured to one another.

Thus, the two end rings 21 are longitudinally opposite one another relative to the stack 1.

Each part 201, 202 comprises a plurality of rods 22, 23 extending parallel to the axis of revolution of the associated end ring 21 and consequently substantially parallel to the axis of rotation of the rotor 1 when the part 201, 202 is installed on the rotor 1.

The rods 22, 23 are distributed substantially regularly in a circumferential manner on the ring, in such a manner as to extend longitudinally over the rotor when the corresponding part 201, 202 is mounted on the rotor 1.

The circumferential distribution of the rods is adapted such as to allow the at least partial insertion of the rods in the notches 12 of the rotor 1 when the corresponding part 201, 202 is installed on the rotor 1.

The rods 22, 23 are dimensioned in terms of length in such a manner that the rod 22 of the first part 201 reaches and can be secured to the rod 23 of the second part 202 when they are mounted about the rotor 1.

Each rod 22, 23 has a main portion 32 and an end portion 31.

Each rod 22 of the first part 201 is designed to be secured on its end portion 31 to the end portion 31 of a rod 23 of the second part 202.

In particular, the rods 22 of the first part 201 are secured by welding to the rods 23 of the second part 202, although the securing technique may vary as a function, for example, of the material used.

The main portion 32 of each rod 22, 23 has a cross section substantially in the form of an isosceles triangle, the base 220 of which has a substantially concave curved form and the height of which extends in a substantially radial direction relative to the associated end ring 21.

The end portion 31 has a length of between ⅛ and ½ of the length of the main portion 32, in this case a length of substantially ⅓ of the main portion 32.

The end portion 31 extends in the extension of the main portion 32, in other words sharing one and the same longitudinal direction of extension X.

The end portion 31 has a reduced thickness relative to the main portion 32.

In this case, the join between the end portion 31 and the main portion 32 forms a shoulder 312.

The end portion 31 has a substantially right prism form with a rectangular base, a base face 221 of which extends in the extension of a side of the main portion adjacent to the base 220 and the other base face 222 having a tab form.

The other base face 222 in tab form corresponds, here, to a welding zone 222.

Thus, the base face 222 of a first rod 22 of the first end 201 is designed to be placed in contact with the base face 222 of another rod 23 of the other part 202 in such a manner as to allow the welding of the end portions 31 to one another.

With reference to FIGS. 3 and 4, the tabs 222 forming the welding zone correspond to a face with a small surface area and extending longitudinally at a distance from the radial edges 223, 224 of the rods 22, 23. This makes it possible in particular to achieve the welds while remaining substantially remote from the windings, which limits the heating of the windings and potential damage.

In particular, the tabs 222 extend longitudinally substantially at mid-distance between two radial edges 223, 224 of the associated rod 22, 23.

In this embodiment, the two parts 201, 202 are substantially identical, and the end portions are produced such that when the first part 201 is placed opposite the second part 202, in particular when they are both installed about the rotor 1, the welding zones 222 of the different rods 22, 23 are associated facing and in contact, in pairs, in such a manner as to allow the welding of each rod 22 of the first part 201 with another rod 23 of the second part 202.

In other words, the two parts 201 and 202 are substantially identical, for example originate from one and the same mold, and shaped in such a manner that when a part 202 is pivoted through 180° relative to the other, in order to be engaged at the other end of the rotor 1, these two parts 201, 202 form two complementary parts capable of being secured.

All the rods 22 of the first part 201 are substantially identical, and all the rods 23 of the second part 202 are substantially identical.

Thus, each rod 22 of the first part 201 may be associated with any one of the rods 23 of the second part 202. Thus, the two parts 201, 202 may be installed about the rotor 1, each rod engaging at least partially in a notch 12 but with no other constraint in terms of the angular orientation of the two parts 201, 202.

In this embodiment, welding of the assembly of the rods 22 of the first part 201 to the corresponding rods 23 of the second part 202 takes place. However, in an alternate version, provision may be made for only some of the rods 22 to be welded, for example in order to reduce the number of weld points.

When the two parts 201, 202 are welded to one another, or secured via any other suitable means, the rods 22 and 23 of the two parts 201 and 202 form an assembly of slot wedges 24 extending between the two holding rings 21.

Thus, the cage 20 formed by the securing of the two parts 201, 202 about the rotor 1 makes it possible at the same time to ensure holding of the end windings by the holding rings 21, and the slot wedges 24 formed make it possible at the same time to ensure radial holding of the windings in the notches, but also ensures the function of tie rods fixing the holding rings 21 in the longitudinal direction.

Furthermore, the two parts 201, 202, in particular the rods 22, 23 of the two parts 201, 202, are treated in such a manner as to be electrically insulated.

Thus, the slot wedges 24 formed are able to fulfil the electric insulation function conventionally performed in the prior art by insulating papers installed between the wedges and the windings.

With a view to ensuring this insulation, in this embodiment the aluminum rods are treated by means of a hard anodizing process. Such a process furthermore makes it possible, when it covers the parts 201 and 202, or at least the rods 22, 23 of the parts 201, 202, to ensure good wear resistance and relatively good thermal and electrical insulation.

According to one implementation of the hard anodizing process on each part 201, 202, it is known that a 50-μm layer makes it possible to obtain a resistance for the layer of approximately 500 Vickers.

Furthermore, such a surface treatment may be adapted such as to reduce the surface roughness of the slot wedges 24 formed and, as a result, to reduce the coefficient of friction between the slot wedge 24 and the installed coil. Thus, it is possible in a simpler manner to insert the rods 22, 23 forming slot wedges 24 into the notches.

The invention is not, however, limited to this insulation process and any surface-based or surface electrical insulation treatment technique may be employed. Thus, no insulation paper has to be fitted, which makes it possible to optimize the time for mounting the rotor assembly.

According to an alternate version, in which the rods 22, 23 are made from an insulating material, for example plastics, no surface insulation treatment is then necessary.

The invention claimed is:

1. A cage for a wound rotor, said wound rotor comprising a body having alternating teeth and notches, said notches being designed to receive a part of a rotor winding, said cage being configured to be mounted about the body of the wound rotor, said cage comprising:
a first part and a second part configured to be secured to one another, each part comprising an end ring and a circumferential plurality of rods extending from said end ring parallel to an axis of revolution of the end ring, each rod having a main portion and an end portion, and for each rod of said first part the end portion of said rod is shaped such as to be configured to be secured to the end portion of at least one complementary rod of the second part when the two parts are installed, each at a longitudinal end of the body of the rotor, in such a manner that said two secured complementary rods form a slot wedge extending between the two end rings of the two parts of the cage, and each main portion of the rods has a cross section substantially in the form of an isosceles triangle, a base of which has a substantially concave curved form, and of which a height extends in a substantially radial direction relative to the associated end ring.

2. The cage as claimed in claim 1, wherein said associated rods secured to one another are welded at their respective end portions.

3. The cage as claimed in claim 1, wherein each rod of the first part is secured to any one of the rods of the second part.

4. The cage as claimed in claim 1, wherein at least two complementary rods each have an end portion of reduced thickness relative to the main portion, and having a substantially right prism form with a rectangular base, of which a base face extends in the extension of said main portion and the other base face having a form of a tab.

5. The cage as claimed in claim 4, wherein the end portions of said complementary rods are shaped such as to allow the placing in contact of said respective tabs and to secure said respective tabs in contact.

6. The cage as claimed in claim 1, wherein each part is made from an aluminum alloy, and said rods are treated in such a manner as to have a surface electrical insulation.

7. The cage as claimed in claim 6, wherein the surface insulation treatment comprises a hard anodizing operation.

8. A rotor assembly comprising:
a wound rotor and the cage as claimed in claim 1.

9. An electric machine comprising:
a stator and the rotor assembly as claimed in claim 8.

* * * * *